(12) United States Patent
Pinder et al.

(10) Patent No.: US 10,947,626 B2
(45) Date of Patent: Mar. 16, 2021

(54) FLUORIDE CORROSION INHIBITION OF METAL SURFACES

(71) Applicant: Halliburton Energy Services, Inc., Houston, TX (US)

(72) Inventors: Tiffany Anne Pinder, Houston, TX (US); Enrique Antonio Reyes, Tomball, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 143 days.

(21) Appl. No.: 16/321,808

(22) PCT Filed: Sep. 1, 2016

(86) PCT No.: PCT/US2016/049820
§ 371 (c)(1),
(2) Date: Jan. 29, 2019

(87) PCT Pub. No.: WO2018/044310
PCT Pub. Date: Mar. 8, 2018

(65) Prior Publication Data
US 2020/0354839 A1 Nov. 12, 2020

(51) Int. Cl.
*C23F 11/14* (2006.01)
*C09K 8/54* (2006.01)
(Continued)

(52) U.S. Cl.
CPC .............. *C23F 11/143* (2013.01); *C09K 8/54* (2013.01); *C09K 8/74* (2013.01); *E21B 41/02* (2013.01); *C09K 2208/32* (2013.01)

(58) Field of Classification Search
CPC .......... C23F 11/143; C09K 8/74; C09K 8/54; C09K 2208/32; E21B 41/02
See application file for complete search history.

(56) References Cited

U.S. PATENT DOCUMENTS

| 3,222,289 A | 12/1965 | Clark et al. |
| 4,766,959 A | 8/1988 | Allison |

(Continued)

FOREIGN PATENT DOCUMENTS

| CN | 104232245 | 12/2014 |
| WO | 2015088519 | 6/2015 |

(Continued)

OTHER PUBLICATIONS

English Translation of CN104232245 (foreign version filed in IDS dated Jan. 29, 2019) (Year: 2014).*

(Continued)

*Primary Examiner* — Andrew J. Oyer
(74) *Attorney, Agent, or Firm* — Thomas Rooney; C. Tumey Law Group PLLC

(57) ABSTRACT

Certain metal surfaces are often unable to be effectively contacted with fluids containing hydrofluoric acid due to significant corrosion issues. Titanium and titanium alloy surfaces represent but one example. Corrosion inhibitor compositions comprising boron-hydroxyalkyl(amine) compound(s) can be used to suppress such metal corrosion, including that taking place on titanium and titanium alloy surfaces, particularly those in a wellbore or in fluid communication with a wellbore.

18 Claims, 9 Drawing Sheets

(51) Int. Cl.
*C09K 8/74* (2006.01)
*E21B 41/02* (2006.01)
*C23F 11/04* (2006.01)

(56) References Cited

U.S. PATENT DOCUMENTS

| | | |
|---|---|---|
| 6,001,186 A | 12/1999 | Johnson et al. |
| 2009/0075844 A1 | 3/2009 | Ke et al. |
| 2010/0314116 A1 | 12/2010 | Ke et al. |
| 2011/0052804 A1 | 3/2011 | Banks |
| 2014/0370320 A1 * | 12/2014 | Humphrey ............. A01N 59/20 428/541 |
| 2016/0265316 A1 | 9/2016 | Reyes et al. |

FOREIGN PATENT DOCUMENTS

| | | | | |
|---|---|---|---|---|
| WO | 2015088587 | | 6/2015 | |
| WO | WO-2015088587 A1 * | | 6/2015 | ............... C09K 8/54 |
| WO | 2016089394 | | 6/2016 | |
| WO | 2016089459 | | 6/2016 | |
| WO | WO-2016089394 A1 * | | 6/2016 | ............. E21B 47/12 |

OTHER PUBLICATIONS

Brazilian Technical Report with Partial English Translation for Application No. BR112019001336 dated May 29, 2020.
J. Electrochem., "A Kinetic Model for the Anodic Dissolution of Ti in HF in the Active and Passive Regions", Journal of the Electrochemical Society, Soc. 2015 vol. 162, Issue 9, H604-H610, 2015.
De-Sheng Kong, "The Influence of Fluoride on the Physicochemical Properties of Anodic Oxide Films Formed on Titanium Surfaces", Langmuir, 2008, 24 (10), pp. 5321-5331, Apr. 29, 2008.
Todd W. Hudnall, Ching-Wen Chiu and Francois P. Gabbai, "Fluoride Ion Recognition by Chelating and Cationic Boranes", Accounts of Chemical Research, 2009, 42 (2), pp. 388-397, Jan. 13, 2009.
International Search Report and Written Opinion for Application No. PCT/US2016/049820 dated Sep. 1, 2016.
Halliburton, Stimulation, "TB-41 Crosslinker", Dec. 2007.
Halliburton, Stimulation, BA-40 or BA-40L Buffering Agents, Jan. 2008.

\* cited by examiner

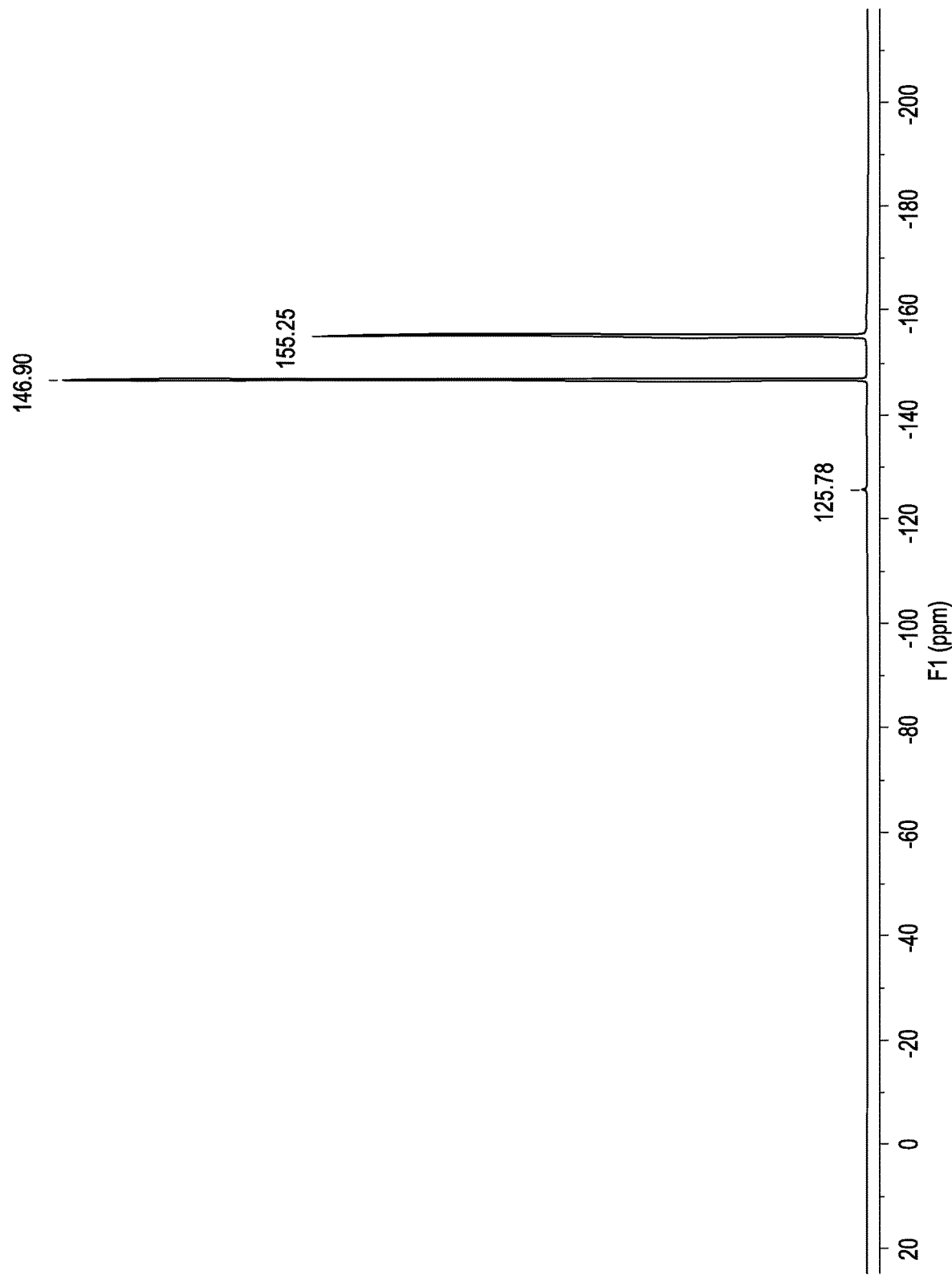

FLUORIDE CORROSION INHIBITION OF METAL SURFACES

BACKGROUND

The present disclosure generally relates to corrosion, and, more specifically, to methods for suppressing corrosion of sensitive metal components, particularly during subterranean treatment operations.

Treatment fluids can be used in a variety of subterranean treatment operations. Such treatment operations can include, without limitation, drilling operations, stimulation operations, production operations, remediation operations, sand control treatments, and the like. As used herein, the terms "treat," "treatment," "treating," and grammatical equivalents thereof, refer to any subterranean operation that uses a fluid in conjunction with achieving a desired function and/or for a desired purpose. Use of these terms does not imply any particular action by the treatment fluid or a component thereof, unless otherwise specified herein. More specific examples of illustrative treatment operations can include, for example, drilling operations, fracturing operations, gravel packing operations, acidizing operations, scale dissolution and removal operations, sand control operations, consolidation operations, and the like.

Corrosive environments comprising an acid can cause severe corrosion damage to many types of metal surfaces. As used herein, the term "corrosion," and grammatical variants thereof, refers to any reaction between a metal surface and its surrounding environment that causes a deterioration or change in the metal surface's properties or morphology. Examples of corrosion damage to a metal surface include, but are not limited to, rusting, metal dissolution or erosion, pitting, peeling, blistering, patina formation, cracking, embrittlement, and any combination thereof.

Acidic treatment fluids are frequently utilized in the course of conducting various subterranean treatment operations. Illustrative uses of acidic treatment fluids during subterranean treatment operations include, for example, matrix acidizing of siliceous and/or non-siliceous formations, scale dissolution and removal operations, gel breaking, acid fracturing, and the like. The acidic component of acidic treatment fluids (e.g., hydrofluoric acid) can be especially corrosive to sensitive metallurgic grades, such as titanium.

Corrosion of metal surfaces within a wellbore penetrating a subterranean formation (e.g., a hydrocarbon producing well, a geothermal well, and the like), such as tubulars and tools, for example, can be highly undesirable due to the difficulty, cost, and production downtime associated with replacing such components. In many instances, elevated temperatures within subterranean formations can dramatically accelerate downhole corrosion rates. Similarly, metal surfaces in fluid communication with a wellbore can be susceptible to corrosion and its undesirable effects. In subsea wellbores, for example, a subsea riser structure extending from the wellbore to a platform or vessel on the ocean's surface or just below the ocean's surface can be susceptible to corrosion, in spite of the low temperatures of deep water environments. Outside the wellbore, corrosion can occur during introduction of a treatment fluid to the wellbore, during production, or any combination thereof. Regardless of its location, corrosion-induced damage of a metal surface can represent a significant safety and/or environmental concern due to potential well failure issues.

BRIEF DESCRIPTION OF THE DRAWING

The following figures are included to illustrate certain aspects of the present disclosure and should not be viewed as an exclusive embodiment. The subject matter disclosed is capable of considerable modifications, alterations, combinations, and equivalents in form and function, as will occur to one having ordinary skill in the art and the benefit of this disclosure.

FIG. 9 shows an illustrative $^{19}$F NMR spectrum of a treatment fluid comprising the corrosion inhibitor composition of the present disclosure at a pH value of 3 including a fluoride source and 15% hydrochloric acid (HCl).

DETAILED DESCRIPTION

Figure 1:
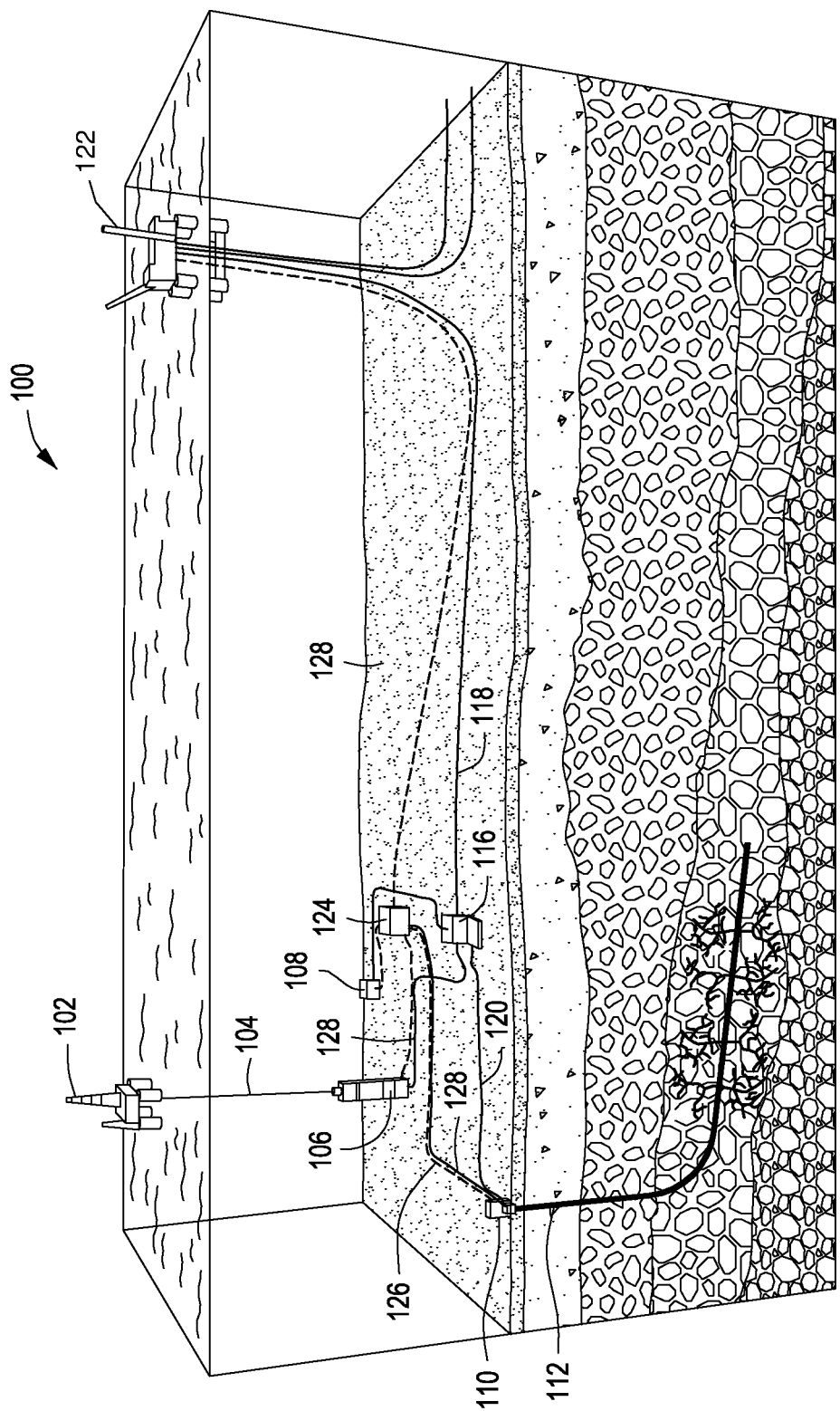
FIG. 1 shows an illustrative schematic of a subsea system into which the corrosion inhibitor compositions of the present disclosure can be introduced for suppressing inhibition of sensitive metal surfaces therein.

The present disclosure generally relates to corrosion, and, more specifically, to methods for suppressing corrosion of sensitive metal components, particularly during subterranean treatment operations, and more particularly during deep water operations.

One or more illustrative embodiments incorporating the features of the present disclosure are presented herein. Not all features of a physical implementation are necessarily described or shown in this application for the sake of clarity. It is to be understood that in the development of a physical implementation incorporating the embodiments of the present disclosure, numerous implementation-specific decisions may be made to achieve the developer's goals, such as compliance with system-related, business-related, government-related and other constraints, which may vary by implementation and from time to time. While a developer's efforts might be time-consuming, such efforts would be, nevertheless, a routine undertaking for one having ordinary skill in the art and the benefit of this disclosure.

Acidic treatment fluids represent a potential corrosion threat to many metal surfaces; however, hydrofluoric acid, which is particularly prevalent in sandstone acidizing operations where the presence of clay and aluminosilicate materials can lead to flow impairment, can be especially damaging when contacting certain types of sensitive metal surfaces. Illustrative examples of particularly sensitive metal surfaces include those containing titanium, titanium alloys, and any combination thereof. As used herein, the term "titanium" encompasses both pure titanium and titanium alloys, unless otherwise specified.

Titanium and titanium alloys are lightweight, strong and resistant to most formation fluids and a great number of common treatment fluids, including those containing organic acids and/or mineral acids, such as hydrochloric acid. Titanium and titanium alloys are electrochemically susceptible to fluoride ions and therefore especially prone to corrosion by even modest quantities of hydrofluoric acid at pH values of about 8 or less. Without being bound by theory or mechanism, it is believed that a passivating layer of $TiO_2$ on titanium metal surfaces is readily removed by hydrofluoric acid, thereby making the underlying titanium metal or titanium alloy extremely susceptible to further corrosion upon its removal. Although inhibited titanium alloys (e.g., Ti Grade 29 alloy, which is inhibited by small amounts of ruthenium, or Ti Grade 7 alloy, which is inhibited by small amounts of palladium) can display a decreased propensity toward corrosion in the presence of hydrofluoric acid than do pristine titanium or uninhibited alloys (e.g., commercially pure titanium, CP-Ti), corrosion is often still an issue. Moreover, cost and sourcing of inhibited titanium alloys can be problematic, especially for large-scale operations.

As discussed in greater detail below, titanium and titanium alloys are often used subterranean formation operation systems, and the use of hydrofluoric acid in such systems can result in corrosion and potential operational compromise to those elements. For example, titanium and titanium alloys are often used as elements in platform completions, specifically deep water marine risers and subsea components. Furthermore, other equipment and components found on the surface of a platform or installation, such as a Floating Production Storage and Offloading (FPSO) unit, can comprise titanium alloys. Examples of these are oil and gas heat exchangers, storage tanks, separator tanks or towers, piping, elbows or Tee fittings, clad, flanges, gaskets, valves, stems, and the like, and any combination thereof. The methods described herein may be used to treat any such equipment or components, which may collectively be referred to "subsea drilling and production system." Accordingly, the titanium and titanium alloys may be part of an offshore system, even if it is not itself below sea level. Similarly, geothermal wells may include production well casings composed of titanium or titanium alloys, and such geothermal wells may have bottomhole temperatures in excess of about 176° C. For example, the titanium or titanium alloys may be elements upstream of the wellhead, and such elements may be equipment and components including, but not limited to, oil and gas heat exchangers, storage tanks, separator tanks or towers, piping, elbows or Tee fittings, clad, flanges, gaskets, and the like, and any combination thereof. Any such elements, equipment, or components may be treated using the treatment fluids described herein, without departing from the scope of the present disclosure.

Treatment fluids for performing acidizing operations in a drilling and production system, including deep water applications, can span very wide temperature ranges (e.g., about 38° C. to about 150° C.), long exposure periods, low pH ranges (e.g., less than about 4 to less than about 0), and in completely acidized fluid environments (e.g., greater than about 1 mole per liter (mol/L) of active hydronium). Accordingly, in such drilling and production systems, there is a plethora of environmental, subsea, and/or reservoir conditions that impose and demand tight operating controls on the treatment fluids employed during acidizing stimulation treatments.

Use of a fluoride scavenger as a corrosion inhibitor during acidizing treatments can provide corrosion protection of titanium and titanium alloy surfaces that is not readily attainable using conventional corrosion inhibitors used to protect steel and steel alloy metal surfaces (e.g., tubulars). Boric acid can be used as effective fluoride scavengers for corrosion inhibition of titanium and titanium alloys; however, high concentrations of boric acid lead to precipitation in aqueous solutions, such as those used in acidizing treatments, even at room temperature. Differently, the present disclosure incorporates a boron-hydroxyalkyl(amine) compound that can be used at high concentrations and remain in solution without significant, if any, precipitation, even at low operating temperatures (e.g., less than about 5° C.).

Accordingly, the instant disclosure provides an aqueous corrosion inhibitor composition comprising a boron-hydroxyalkyl(amine) compound that acts as a fluoride ion (e.g., hydrofluoric acid) scavenger that protests against sensitive metal surfaces, such as titanium and titanium alloys, in a drilling and production system, including deep water systems, by suppressing the corrosion of such sensitive metal surfaces. As used herein, the terms "inhibit," "inhibitor," "inhibition," and grammatical variants thereof, refers to the suppression of the tendency of a phenomenon to occur and/or the degree to which that phenomenon occurs. The terms "suppress," "suppression," and grammatical variants thereof, refers to the lessening, reduction, or prevention of the tendency of a phenomenon to occur and/or the degree to which that phenomenon occurs. The term "inhibit," and variants thereof, does not imply any particular extent or amount of suppression, unless otherwise specified herein.

Advantageously, the corrosion inhibitor composition comprising the boron-hydroxyalkyl(amine) compound(s) of the present disclosure is a boron-nitrogen adduct that is stable, having little or no precipitation or crystallization, even at low temperatures (e.g., less than about 10° C., or less than about 5° C.) and over extended time periods (e.g., greater than about 30 days). Moreover, the corrosion inhibitor composition can also be prepared by advantageously mixing the constituting sources of boron and a water soluble hydroxyalkyl(amine). The use of the boron-nitrogen adduct provides advantages in terms of logistics and method of use, such as less volume of liquid materials to transport to the wellsite. The use of individual, constituting chemical or material sources of boron may additionally facilitate the preparation of the corrosion inhibitor composition with respect to operational efficiency. For instance, employing liquid streams of the boron source and of the hydroxyalkyl (amine) source (e.g., tri(alkyl alcohol)amine and the alkyl is an ethyl, a propyl, a butyl, a pentyl, or any isomer thereof) can allow for the use of readily available materials. Furthermore, it can facilitate the preparation of the corrosion inhibitor composition via liquid additive pumps or "on-the-fly" mode of blending, as opposed to batch mixing which can lead to longer preparation times. As used herein, the term "on-the-fly" refers to performing an operation during a subterranean treatment that does not require stopping normal operations.

Thus, the corrosion inhibitor composition described herein can be used to suppress corrosion of titanium and titanium alloys in any subterranean formation system, including subsea systems, even after prolonged exposure (e.g., due to unforeseen circumstances, such as extended delays during the flow back of spent fluid due to forces of nature). The use of the boron-hydroxyalkyl(amine) compound(s) described herein additionally allows for saturation up to about 50% by weight per volume (w/v) of the boron-hydroxyalkyl(amine) to an aqueous-based fluid at pH >8 (e.g., forming part of the corrosion inhibitor composition alone, or upon dilution in a treatment fluids, such as an acidic treatment fluid), with little or no precipitation or crystallization. This is in sharp contrast to standard boric acid ($B(OH)_3$) fluoride scavengers, which exhibit significant precipitation at such saturation concentrations, even at much higher temperatures (e.g., room temperature). For example, boric acid will precipitate at concentrations of greater than or equal to about 5% by weight per volume of an aqueous-based fluid. Indeed, the corrosion inhibitor composition comprising the boron-hydroxyalkyl(amine) compound(s) exhibit very high solubility in aqueous-based fluids, quantitatively almost 10 times greater that the solubility of boric acid. Because of this solubility, the corrosion inhibitor composition described herein allows for high borate concentration in small volumes. For example, the solubility in fresh water of the boron-hydroxyalkyl(amine) compound(s) of the present disclosure may be about 30 grams per 100 milliliters of fresh water having a pH of 8, even at 4-5° C. for at least for 24 hours. Thus, the volume of the corrosion inhibitor composition can be reduced, such as to about 70% aqueous-based fluid (as opposed to traditionally about 97% aqueous-based fluid for boric acid). Moreover, the corrosion inhibitor composition can comprise 15% by weight of boron-nitrogen adduct and effectively scavenge fluoride at pH equal or greater than about 5.

The corrosion inhibitor compositions described herein are additionally compatible with acidizing treatment fluids used in acidizing operations, such as in sandstone subterranean formations, and effectively acts as a fluoride scavenger corrosion inhibitor at a pH ranges of equal to or less than about 8, encompassing any value and subset therebetween. For example, the corrosion inhibitor is effective at a pH of about 8 to less than about 0, or about 8 to 0, or about 5 to 1, or about 3 to 0, or about 3 to less than about 0, encompassing any value and subset therebetween. Accordingly, the pH of the corrosion inhibitor composition may be equal to or less than about 8, the pH of a treatment fluid comprising the corrosion inhibitor may be equal to or less than about 8, and/or the environment into which the corrosion inhibitor composition is introduced may be equal to or less than about 8, without departing from the scope of the present disclosure, and encompassing any range and subset aforementioned or therebetween.

As previously stated, the corrosion inhibitor composition may be used in any subterranean formation operation, or drilling and/or production system, without limitation to suppress the effects of corrosion to titanium and titanium alloy components within the system. In some embodiments, the corrosion inhibitor composition is used in subsea applications and introduced into a subsea hydrocarbon producing reservoir through a subsea riser. Referring now to FIG. 1, illustrated is a schematic subsea system into which the corrosion inhibitor compositions of the present disclosure can be introduced for suppressing inhibition of sensitive metal surfaces therein, according to one or more embodiments of the present disclosure. The subsea system 100 may have components, as described below, located in more than 500 to 3,500 meters of seawater, where the temperature can less than or equal to about 5° C. As shown, the subsea system 100 includes a drilling rig 102. The drilling rig 102 is illustrated as a floating platform, but it is to be appreciated that the drilling rig may be any type of bottom supported platform or floating platform, without departing from the scope of the present disclosure. Accordingly, without limitation, the drilling rig may be a stationary rig, a jack-up rig, a semi-submersible rig, a drill ship, a tension leg platform rig, a guyed rig, an articulated column rig, and the like. Many other configurations are possible and have been developed over the years.

A drilling riser 104 is shown extending from the drilling rig 102 below the sea surface, where the drilling riser 104 is in fluid communication with the drilling rig 102 via a top riser stress joint. The drilling riser 104 is equipped with a subsea blowout preventer (BOP) stack 106, which operates to seal, control, and monitor pressure and uncontrolled flow emanating from a well reservoir. The BOP 106 may be installed at any location below the drilling rig, included on the sea floor, as shown. The drilling riser 104 (and BOP 106) is installed at the seafloor to a subsea wellhead 108, and fluidly coupled thereto via a bottom riser stress joint. It is to be appreciated that the top and bottom riser stress joints may be located at any length along drilling riser 104 between the riser 104 and the drilling rig 102 and the subsea wellhead 108 depending on the design of the particular subsea system, without departing from the scope of the present disclosure.

The subsea wellhead 108 provides the suspension point and pressure seals for casing string that run from the bottom of the hole sections to the surface pressure control equipment. Additional components of the system 100 include a subsea tree 110 that defines the top of wellbore 112, which provides a control to the flow of in and out of the wellbore 112. The wellbore 112 may be cased, uncased, or partially cased, without departing from the scope of the present disclosure.

A subsea header(s) 116, flowline(s) 118, and flowline jumper(s) 120 are shown for distributing fluids to and from the surface, wellbore, or production platform 122. An umbilical system provides communication between subsea controls and topside controls for all equipment. As shown, the umbilical system includes a subsea umbilical termination assembly (SUTA) 124, flying lead(s) 126, and umbilical line(s) 128. As used herein, the term "umbilical" or "umbilical line," and grammatical variants thereof, refers to any one or more conduits capable of introducing at least chemical substances and fluids into a subsea system. The umbilical system can transmit fluid (e.g., as a chemical injection) and/or electrical current necessary to control the functions of the subsea components of the system 100. Accordingly, the umbilical system allows fluid flow through the drilling riser 104 and throughout the subsea components of the system 100 and to the production platform 122. Additional conduits can be in operation in a subsea installation such as capillary string injection lines.

The configuration illustrated in FIG. 1 permits the flow of treatment fluids, such as the acidizing treatment fluids and corrosion inhibitor compositions described herein, through the drilling riser 104 from the drilling rig 102 at the surface of the sea, through the BOP 106, and to the wellhead 108, where the treatment fluid can then be circulated in the wellbore and throughout the remainder of the system 100. The system 100 additionally provides a conduit for circulated treatment fluids to be returned from the wellbore to the surface. In some embodiments, the corrosion inhibitor composition or treatment fluids described herein can be introduced through the umbilical line(s) 128 to a corrosive environment comprising sensitive metal surfaces within the system 100, such as at or after the subsea wellhead, which can be then distributed in a one way direction to sensitive metal surfaces. Any other means of introducing the corrosion inhibitor composition and/or treatment fluids described herein into a subsea (or land-based system) may be suitable, without departing from the scope of the present disclosure including, but not limited to, tubing string (e.g., casing), coiled tubing, one or more flowline(s) 118, and the like, and any combination thereof.

It is to be recognized that system 100 is merely exemplary in nature and various additional components may be present that have not necessarily been depicted in FIG. 1 in the interest of clarity. Non-limiting additional components that may be present include, but are not limited to, any components used as part of a subsea drilling and production system, such as subsea drilling systems, subsea Christmas trees and wellhead systems, umbilical and riser systems, subsea manifolds and jumper systems, tie-in and flowline systems, control systems, subsea installation, and any combination thereof. Such non-limiting components may include, but are not limited to, supply hoppers, valves, fasteners, condensers, adapters, joints, gauges, sensors, compressors, pressure controllers, pressure sensors, flow rate controllers, flow rate sensors, temperature sensors, transmitters, hydraulic distribution manifolds and modules, logic caps, couplers (e.g., hydraulic, electrical, and the like), spools, seals, hangers, bushings, and the like.

Any portion of the subsea system 100 or a land-based system that comprises a sensitive metal surface and comes into contact with a corrosive, or acidic, environment, such as by contact with an acidizing treatment, may be treated with the corrosion inhibitor composition of the present disclosure. Examples of specific components that can be composed of titanium or titanium alloys include, but are not limited to, subsea drilling and production risers, top stress joints, bottom stress joints, downhole casing (e.g., subsea casing or geothermal casing in a geothermal well, such as those having temperatures greater than about 176° C.), and any combination thereof. Accordingly, in some embodiments, the metal surface being introduced to the corrosive inhibitor composition may be present in a wellbore into which the treatment fluid is being introduced. For example, metal surfaces in a wellbore that may be introduced to the corrosion inhibitor composition may represent a tubular, or a portion of a tubular (e.g., a fitting), or a portion of a wellbore tool. In yet other various embodiments, the metal surface may not be present in the wellbore per se, but may instead represent a structure in fluid communication with the wellbore. For example, metal surfaces such as pipelines, subsea riser structures, stress joints, mixing tanks, and storage vessels outside the wellbore may also be introduced to the corrosive inhibitor composition to suppress corrosion of sensitive metal surfaces thereof.

The present disclosure describes an aqueous-based corrosion inhibitor composition comprising a boron-hydroxyalkyl(amine) in solution, which is capable of suppressing corrosion of sensitive metal environments, including titanium and titanium alloys. In one or more embodiments, the present disclosure provides a method of introducing the corrosion inhibitor composition into a corrosive environment comprising a fluoride source and a metal surface comprising titanium or a titanium alloy therein. The corrosion inhibitor composition suppresses corrosion of the metal surface by the corrosive environment. The corrosion inhibitor composition comprises a boron-hydroxyalkyl(amine) in an aqueous-based solution. Without being bound by theory or mechanism, suppression of corrosion of the metal surface is believed to be able to occur via a reaction with the boron-hydroxyalkyl(amine) compound while it is in solution, such as with the fluoride source which may or may not be in physical contact with the metal surface. Accordingly, the boron-hydroxyalkyl(amine) compound itself need not contact the metal surface in order to suppress corrosion of the metal surface. However, it is believed that contacting the metal surface with the boron-hydroxyalkyl(amine) compound itself would additionally be sufficient to suppress corrosion of the metal surface by reacting with the fluoride source, without departing from the scope of the present disclosure.

In some embodiments, the corrosion inhibitor composition is itself included as part of a treatment fluid for use in an acidizing operation. In such embodiments, the treatment fluid comprises a fluoride source and the corrosion inhibitor composition comprising the boron-hydroxyalkyl(amine) compound(s). The treatment fluid may be introduced to a metal surface located within a wellbore penetrating a subterranean formation or at a location forming part of a system in fluid communication with the wellbore, as described above with reference to FIG. 1.

The fluoride source forming part of the corrosive environment or included in an acidizing treatment fluid may be selected from the group consisting of a fluoride ion, hydrofluoric acid, a hydrofluoric acid-generating compound, and any combination thereof. Suitable hydrofluoric acid-generating compounds may include substances such as, for example, fluoroboric acid, fluorosulfuric acid, hexafluorophosphoric acid, hexafluoroantimonic acid, difluorophosphoric acid, hexafluorosilicic acid, potassium hydrogen difluoride, sodium hydrogen difluoride, polyvinylammonium fluoride, polyvinylpyridinium fluoride, pyridinium fluoride, imidazolium fluoride, ammonium fluoride, tetrafluoroborate salts, hexafluoroantimonate salts, hexafluorophosphate salts, bifluoride salts (e.g., ammonium bifluoride), perfluorinated organic compounds, boron trifluoride, and various boron trifluoride complexes, and the like, and any combination thereof.

In some embodiments, the boron-hydroxyalkyl(amine) compound is selected to have a boron-nitrogen molar equivalency of about 1:1. In other examples, the boron-hydroxyalkyl(amine) compound is selected to have a boron-nitrogen molar equivalency of about 1:1, or 1.5:0.5, or 1.75:0.25, or 0.5:1, or 1:0.5, or 3:1, or 5:1, encompassing any value and subset therebetween. As used herein, the term "boron-nitrogen molar equivalency" means the adduct contains one boron and one mole of a tertiary amine.

As specific examples, in some embodiments, the boron-hydroxyalkyl(amine) compound is the reaction product of an amine and a boric acid triester selected from the group consisting of 2-ethoxy-4,4,5,5-tetramethyl-1,3,2-dioxaborolane, 2-isopropoxy-4,4,5,5-tetramethyl-1,3,2-dioxaborolane, 2-isopropoxy-4,4,6-trimethyl-1,3,2-dioxaborinane, 2-methoxy-4,4,5,5-tetramethyl-1,3,2-dioxaborolane, tributyl borate, tridecyl borate, triethyl borate, trihexyl borate, triisopropyl borate, 2,4,6-trimethoxyboroxin, trimethyl borate, trioctadecyl borate, tri-n-octyl borate, triphenyl borate, tripropyl borate, tris(4-chlorophenyl) borate, tris(2-cyanoethyl) borate, tris(hexafluoroisopropyl) borate, tris(2,2,2-trifluoroethyl) borate, tris(trimethylsilyl) borate, tritetradecyl borate, tri-o-tolyl borate, and any combination thereof.

In further specific embodiments, the boron-hydroxyalkyl (amine) compound is selected from the group consisting of triethanolamine borate, a derivative of triethanolamine borate, and any combination thereof. Triethanolamine borate may have the structure shown in Formula 1:

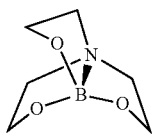

Formula 1

As used herein, the term "derivative" refers to any compound that is made from one of the listed compounds, for example, by replacing one atom in one of the listed compounds with another atom or group of atoms, ionizing one of the listed compounds, or creating a salt of one of the listed compounds. For example, suitable derivatives of triethanolamine borate may have its aryl and alkyl groups varied on the alpha carbon. An example of such a derivative of triethanolamine borate is triisopropanolamine borate.

As previously stated, the boron-hydroxyalkyl(amine) compound(s) of the present disclosure allows for saturation up to about 50% by weight per volume of the boron-hydroxyalkyl(amine) to an aqueous-based fluid (e.g., forming part of the corrosion inhibitor composition alone, or upon dilution in a treatment fluids, such as an acidic treatment fluid), with little or no precipitation or crystallization. Accordingly, boron-hydroxyalkyl(amine) may be present in the corrosion inhibitor composition or a treatment fluid in an amount of about 50% to about 0.5% by weight per volume of the an aqueous-based fluid, encompassing any value and subset therebetween. For example, the boron-hydroxyalkyl (amine) may be present in the corrosion inhibitor composition or a treatment fluid in an amount of about 0.5% to about 50%, or 10% to about 40%, or about 20% to about 30%, or about 3% to about 10%, or about 1% to about 5% by weight per volume of the an aqueous-based fluid, encompassing any value and subset therebetween.

As used herein, the term "aqueous-based fluids" encompass aqueous fluids and aqueous-miscible fluids, including those which may provide alone or in combination with other fluids the fluoride source described herein. Suitable aqueous fluids may include, but are not limited to, fresh water, saltwater (e.g., water containing one or more salts dissolved therein), brine (e.g., saturated salt water), seawater, produced water, treated wastewater, and any combination thereof. Suitable aqueous-miscible fluids may include, but not be limited to, alcohols (e.g., methanol, ethanol, n-propanol, isopropanol, n-butanol, sec-butanol, isobutanol, and t-butanol), glycerins, glycols (e.g., polyglycols, propylene glycol, and ethylene glycol), polyglycol amines, polyols, any derivative thereof, any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate), any in combination with an aqueous-based fluid, and any combination thereof.

The corrosive environment contacting the metal surface generally comprises a fluid phase, such as a corrosive environment comprising a treatment fluid, such as an acidizing treatment fluid. Although the corrosion inhibitor composition of the present disclosure may promote corrosion inhibition of a metal surface present within a wellbore or a location in fluid communication with a wellbore (e.g., within or portions of a subsea drilling and production system), it is to be recognized that the corrosion inhibiting effects described herein may be realized in any type of in-process setting. For example, the corrosion inhibitor composition may be used for suppressing corrosion of a metal surface, such as titanium or a titanium alloy, in a plant or process setting in which hydrofluoric acid is used. Illustrative process settings in which the corrosion inhibitor composition may be used to suppress corrosion include, for example, manufacturing processes using dilute hydrofluoric acid solutions, storage and transport structures for dilute hydrofluoric acid solutions, and the like.

In more specific embodiments, the metal surface may contact the corrosive environment in the course of performing a subterranean treatment operation, such as an acidizing operation. Accordingly, in such embodiments, the corrosive environment may comprise a treatment fluid. In some embodiments, the corrosion inhibitor composition is introduced to the corrosive environment after the corrosive environment contacts the metal surface. In some embodiments, the corrosion inhibitor composition may be present in the treatment fluid initially, as described above. For example, the treatment fluid may contain a fluoride source (e.g., the sole or a portion of the source forming the corrosive environment) and the corrosion inhibitor composition, and thus contacts the metal surface simultaneously or the corrosion inhibitor may prevent the fluoride source from contacting the metal surface after a period of time. In alternative embodiments, the corrosion inhibitor composition may be exposed to the metal surface before the corrosive environment is established (e.g., pre-treating the metal surface). That is, when performing a treatment operation, a treatment fluid comprising one or more components of the corrosion inhibitor composition can be introduced to a wellbore after, simultaneously, or before a treatment fluid comprising one or more fluoride sources. In some instances, the fluoride source(s), the boron-hydroxyalkyl(amine) compound(s), or any combination thereof may be contacted with the metal surface in any order, without compromising suppression of corrosion.

Accordingly, in some embodiments, one or more separate fluid streams comprising the corrosion inhibitor composition may be introduced to (or exposed to) a metal surface and subsequently combine with a treatment fluid comprising a fluoride source to form a combined treatment fluid. Alternatively, the corrosion inhibitor composition may be added to a treatment fluid after the treatment fluid has already begun being introduced to the metal surface. In some embodiments, the corrosion inhibitor composition may be added on-the-fly to a treatment fluid being introduced to a metal surface. In other embodiments, the corrosion inhibitor composition may be present in the treatment fluid before introduction of the treatment fluid to the metal surface begins.

In additional embodiments, the treatment fluids described herein, including or excluding the corrosion inhibitor composition, may further comprise any number of additives that are commonly used in downhole operations and have sufficient solubility in aqueous-based fluids, including, for example, silica scale control additives, surfactants, gel stabilizers, anti-oxidants, polymer degradation prevention additives, relative permeability modifiers, scale inhibitors, foaming agents, defoaming agents, antifoaming agents, emulsifying agents, de-emulsifying agents, iron control agents, proppants or other particulates, particulate diverters, salts, acids, fluid loss control additives, gas, catalysts, clay control agents, dispersants, flocculants, scavengers (e.g., $H_2S$ scavengers, $CO_2$ scavengers or $O_2$ scavengers), gelling agents, lubricants, friction reducers, bridging agents, viscosifiers, weighting agents, solubilizers, pH control agents (e.g., buffers), methane hydrate inhibitors, consolidating agents, bactericides, catalysts, clay stabilizers, breakers, delayed release breakers, and the like, and any combination thereof.

Examples of suitable methane hydrate inhibitors may include, but are not limited to, methanol, methylene glycol, ethylene glycol, triethylene glycol, higher glycols, and the like, and any combination thereof. Methane hydrate control is necessary to reduce the risk of problems caused by hydrates in hydrocarbon production systems, such as line (e.g., umbilical) blockages and plugs. Low dosage hydrate inhibitors (LDHI) may be used to inhibit the formation of methane hydrates. The term "low dosage" is based on thermodynamic/molar freezing point depression baselines. Examples of these LDHIs include the suitable methane hydrate inhibitors discussed above (e.g., methanol, ethylene glycol, triethylene glycol, and the like). These LDHIs prevent the formation of a hydrate blockage at low dosage rates. LDHI's are broken into two classes: kinetic hydrate inhibitors (KHI) and anti-agglomerate hydrate inhibitors (AA). KHIs retard the growth of hydrate crystals, do not require a liquid hydrocarbon phase, and include polyacrylamide-based polymers. AAs act like dispersants, allowing micelles of hydrates to form but dispersing them so they do not bridge off. AAs act independently of subcooling, provided that the temperature is not below the freezing point of water, and do require a liquid hydrocarbon phase to be effective.

In specific embodiments, the metal surface within a corrosive environment for introduction of the corrosion inhibitor composition may comprise at least a portion of a subsea riser structure, including the riser itself, one or more stress joints, and any combination thereof. At least a portion of a subsea riser structure may comprise titanium or a titanium alloy. In still more specific embodiments, at least a portion of a subsea riser structure may comprise multiple types or grades of titanium alloys. Accordingly, by introduction the subsea riser structure to a corrosion inhibitor composition of the present disclosure, corrosion resulting from contact with a corrosive environment, such as hydrofluoric acid (i.e., a fluoride source), may be suppressed. In some embodiments, the corrosion inhibitor composition is conveyed to the corrosive environment comprising the metal surface via one or more subsea umbilical(s).

In other specific embodiments, methods of the present disclosure may comprise introducing a treatment fluid containing the corrosion inhibitor composition to a metal surface forming a portion of a land-based or subsea drilling and/or production system. The corrosion inhibitor composition may suppress corrosion of the metal surface present in a wellbore or in fluid communication with the wellbore thereof.

Embodiments disclosed herein include:

Embodiment A: A method comprising: introducing a corrosion inhibitor composition to a corrosive environment, the corrosive environment including a fluoride source and a metal surface comprising titanium or a titanium alloy, wherein the corrosion inhibitor composition comprises an aqueous-base fluid and a boron-hydroxyalkyl(amine) compound; and suppressing corrosion of the metal surface by the corrosive environment with the corrosion inhibitor composition.

Embodiment B: A method comprising: providing a treatment fluid comprising: a fluoride source and a corrosion inhibitor composition comprising an aqueous-based fluid and a boron-hydroxyalkyl(amine) compound; introducing the treatment fluid into a downhole location including a metal surface comprising titanium or a titanium alloy, wherein the downhole location is selected from the group consisting of a location in a wellbore penetrating a subterranean formation, a location in fluid communication with the wellbore, and any combination thereof; and suppressing corrosion of the metal surface by the fluoride source with the corrosion inhibitor composition.

Each of embodiments A and B may have one or more of the following additional elements in any combination:

Element 1: Wherein the corrosion inhibitor composition further comprises a methane hydrate inhibitor.

Element 2: Wherein the fluoride source is selected from the group consisting of a fluoride ion, hydrofluoric acid, a hydrofluoric acid-generating compound, and any combination thereof.

Element 3: Wherein the boron-hydroxyalkyl(amine) compound has a boron-nitrogen molar equivalency of about 1:1.

Element 4: Wherein the boron-hydroxyalkyl(amine) compound is a reaction product of an amine and a boric acid triester, the boric acid triester selected from the group consisting of 2-ethoxy-4,4,5,5-tetramethyl-1,3,2-dioxaborolane, 2-isopropoxy-4,4,5,5-tetramethyl-1,3,2-dioxaborolane, 2-isopropoxy-4,4,6-trimethyl-1,3,2-dioxaborinane, 2-methoxy-4,4,5,5-tetramethyl-1,3,2-dioxaborolane, tributyl borate, tridecyl borate, triethyl borate, trihexyl borate, triisopropyl borate, 2,4,6-trimethoxyboroxin, trimethyl borate, trioctadecyl borate, tri-n-octyl borate, triphenyl borate, tripropyl borate, tris(4-chlorophenyl) borate, tris(2-cyanoethyl) borate, tris(hexafluoroisopropyl) borate, tris(2,2,2-trifluoroethyl) borate, tris(trimethylsilyl) borate, tritetradecyl borate, tri-o-tolyl borate, and any combination thereof.

Element 5: Wherein the boron-hydroxyalkyl(amine) compound is selected from the group consisting of triethanolamine borate, a derivative of triethanolamine borate, and any combination thereof, or wherein the boron-hydroxyalkyl (amine) compound is a mixture of a boron source and tri(alkyl alcohol)amine and the alkyl is an ethyl, a propyl, a butyl, a pentyl, or any isomer thereof.

Element 6: Wherein the metal surface is located in a subsea drilling and production system.

Element 7: Wherein the metal surface is located in a subsea drilling and production system and is selected from the group consisting of a drilling riser, a top stress joint, a bottom stress joint, a downhole casing, and any combination thereof.

Element 8: Wherein the metal surface is located in a subsea drilling and production system and the corrosion inhibitor composition is introduced through an umbilical.

Element 9: Wherein the metal surface is downhole casing in a geothermal well.

Element 10: Wherein the metal surface is downhole casing in a geothermal well having a bottomhole temperature greater than about 176° C.

By way of non-limiting example, exemplary combinations applicable to A and B include: 1-10; 1, 3, and 5; 2 and 8; 6, 7, and 9; 4 and 8; 3, 6, 8, and 10; 8 and 10; 2, 3, and 5; and any non-limiting combination of one or more of 1-10, without limitation.

Embodiment C: A treatment fluid comprising: a fluoride source; and a corrosion inhibitor composition comprising an aqueous-based fluid and a boron-hydroxyalkyl(amine) compound.

Embodiment C may have one or more of the following additional elements in any combination:

Element 1C: Wherein the corrosion inhibitor composition further comprises a methane hydrate inhibitor.

Element 2C: Wherein the fluoride source is selected from the group consisting of a fluoride ion, hydrofluoric acid, a hydrofluoric acid-generating compound, and any combination thereof.

Element 3C: Wherein the boron-hydroxyalkyl(amine) compound has a boron-nitrogen molar equivalency of about 1:1.

Element 4C: Wherein the boron-hydroxyalkyl(amine) compound is a reaction product of an amine and a boric acid triester, the boric acid triester selected from the group consisting of 2-ethoxy-4,4,5,5-tetramethyl-1,3,2-dioxaborolane, 2-isopropoxy-4,4,5,5-tetramethyl-1,3,2-dioxaborolane, 2-isopropoxy-4,4,6-trimethyl-1,3,2-dioxaborinane, 2-methoxy-4,4,5,5-tetramethyl-1,3,2-dioxaborolane, tributyl borate, tridecyl borate, triethyl borate, trihexyl borate, triisopropyl borate, 2,4,6-trimethoxyboroxin, trimethyl borate, trioctadecyl borate, tri-n-octyl borate, triphenyl borate, tripropyl borate, tris(4-chlorophenyl) borate, tris(2-cyanoethyl) borate, tris(hexafluoroisopropyl) borate, tris(2,2,2-trifluoroethyl) borate, tris(trimethylsilyl) borate, tritetradecyl borate, tri-o-tolyl borate, and any combination thereof.

Element 5C: Wherein the boron-hydroxyalkyl(amine) compound is selected from the group consisting of triethanolamine borate, a derivative of triethanolamine borate, and any combination thereof, or wherein the boron-hydroxyalkyl (amine) compound is a mixture of a boron source and tri(alkyl alcohol)amine and the alkyl is an ethyl, a propyl, a butyl, a pentyl, or any isomer thereof.

By way of non-limiting example, exemplary combinations applicable to C include: 1C-5C; 1C, 2C, and 5C; 2C and 4C; 3C, 4C, and 5C; 1C and 5C; and any non-limiting combination of one or more of 1C-5C, without limitation.

To facilitate a better understanding of the embodiments of the present disclosure, the following examples of preferred or representative embodiments are given. In no way should the following examples be read to limit, or to define, the scope of the disclosure.

EXAMPLES

Nuclear magnetic resonance (NMR) spectroscopic analysis was carried out using a Bruker Ultrashield 500_MHz spectrometer employing a 5-mm broadband probe. Each sample was diluted with deuterium oxide ($D_2O$) before subjected to NMR analysis. A 90° pulse (12.10 μsec) was used for Fluorine-19 ($^{19}F$) calibrated with 0.1 M NaF solution (reference chemical shift set to −119 ppm) and Boron-11 ($^{11}B$) was calibrated with 0.1 M boric acid ($H_3BO_3$) (11.9 μsec) and reference chemical shift set to 36 ppm. Chemical shifts were evaluated using each of a $^{11}B$ spectrum and a $^{19}F$ spectrum of the treatment fluid at a pH value >6 and a pH value ≤5 for the ability of a boron-hydroxyalkyl(amine) compound to suppress corrosion. Chemical shifts are expressed in parts per million (ppm) by frequency. The control treatment fluids described and tested below comprise 0.095 moles of a boron-hydroxyalkyl (amine) compound of triethanolamine borate (TEA-B), and a fresh water aqueous-based methanolic solution (35% by weight). To the control treatment fluids, an amount of fluoride source of ammonium bifluroide (ABF) was added to form the treatment fluids, as shown in Table 1, and broken into Example 1 and Example 2 for explanation purposes. As a matter of capturing the condition where there is sub-stoichiometric amount of boron, both of TFA and TFB used at least 100% excess fluoride, fluoride-to-boron ratio (F/B) concentration ratio of >4. Such condition is captured where the benefit of using boron to complex or attract fluoride ions is evidenced in the $^{19}F$ NMR spectra, which show the presence of free fluoride (chemical shift −119 to −115 ppm) as well as some of the key boron-fluoride species.

TABLE 1

| 30% TEA-B in 50 mL of $H_2O$ | | | | |
|---|---|---|---|---|
| Example | pH | Moles of ABF (grams) | Moles of TEA-B (grams) | F/B |
| Example 1 | 6.6 | 0.363 (20.7) | 0.095 (15) | 8 |
| | 5.9 | 0.477 (27.2) | 0.095 (15) | 10 |
| Example 2 | 5.8 | 0.535 (30.5) | 0.095 (15) | 11 |
| | 3 | 0.535 (30.5) | 0.095 (15) | 11 |

Figure 2:
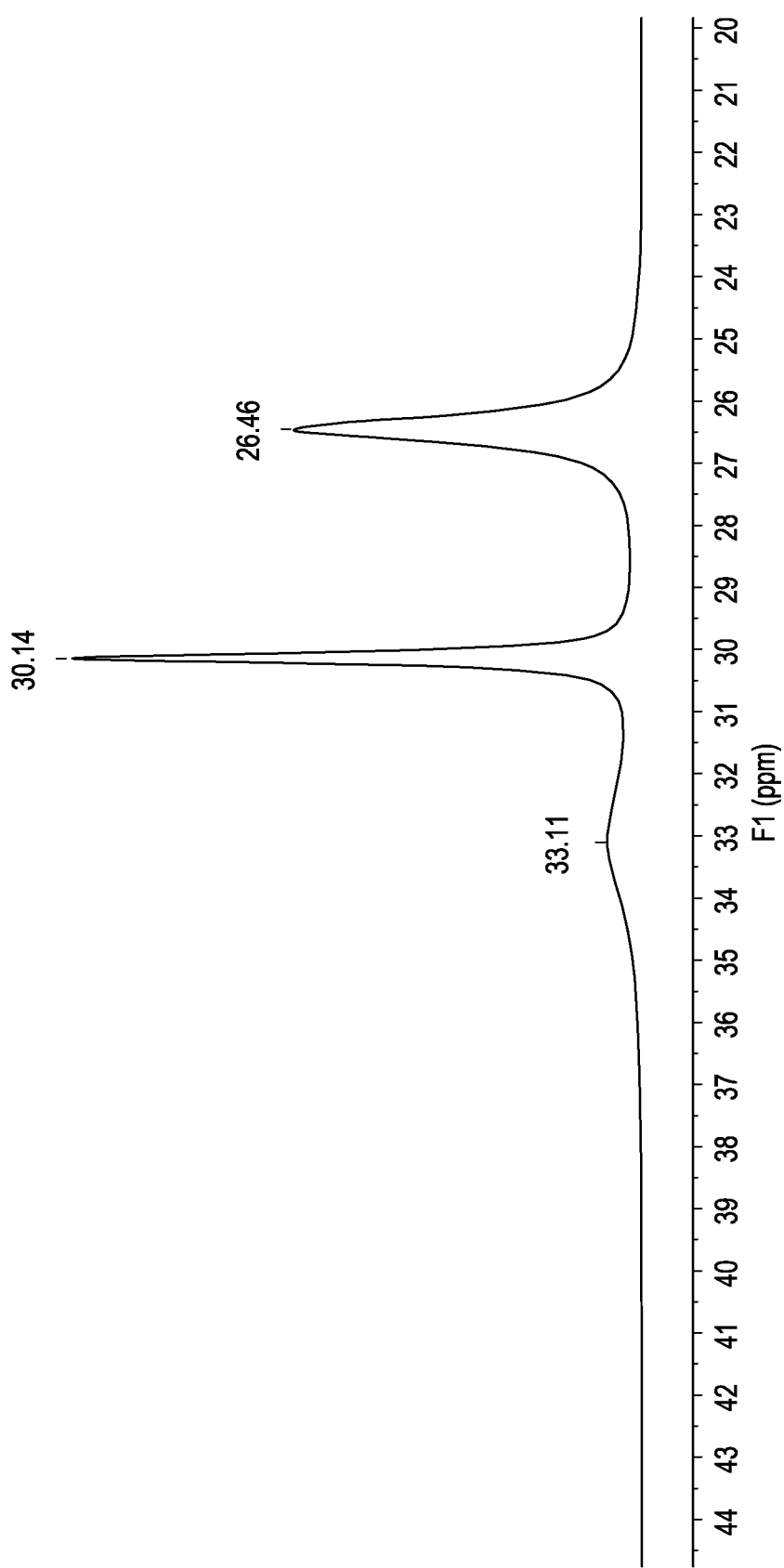
FIG. 2 shows an illustrative $^{11}$B NMR spectrum of a treatment fluid comprising the corrosion inhibitor composition of the present disclosure at a pH value of ≥8 absent a fluoride source.

Example 1: The $^{11}B$ spectra of the control treatment fluid comprising only 0.095 moles of TEA-B and no ABF was obtained with unbuffered solutions at a pH of ≥8. After addition of the ABF, as shown in Table 1, the treatment fluids were evaluated at pH=6.6 or pH=5.9 after addition of the ABF to assess the complex equilibria that the treatment fluid undergoes with fluoride. As shown in FIG. 2, the $^{11}B$ NMR spectrum of 30% TEA-B in fresh water at pH≥8 in the absence of ABF displays three distinct broad signals, which correspond to $B(OR)_3$:$N(EtOH)_3$ at 30.14 ppm, a complex identified as a ligand of the form HL-B(OH) at 26.46 ppm where L=:$N(EtOH)_3$. The signal at 33.11 ppm corresponds to the boric/borate equilibrium species and shows that the concentration is relatively low with respect to the active species which are TEA-B(OR)$_3$. Moreover, the complexes described herein, TEA-B and TEA-B(OR)$_3$, are not dissociating at any appreciable rate as is the case with a simple solution of the respective reagents in equilibrium, which shows that the predominant species is the borate/boric pair.

Figure 3:
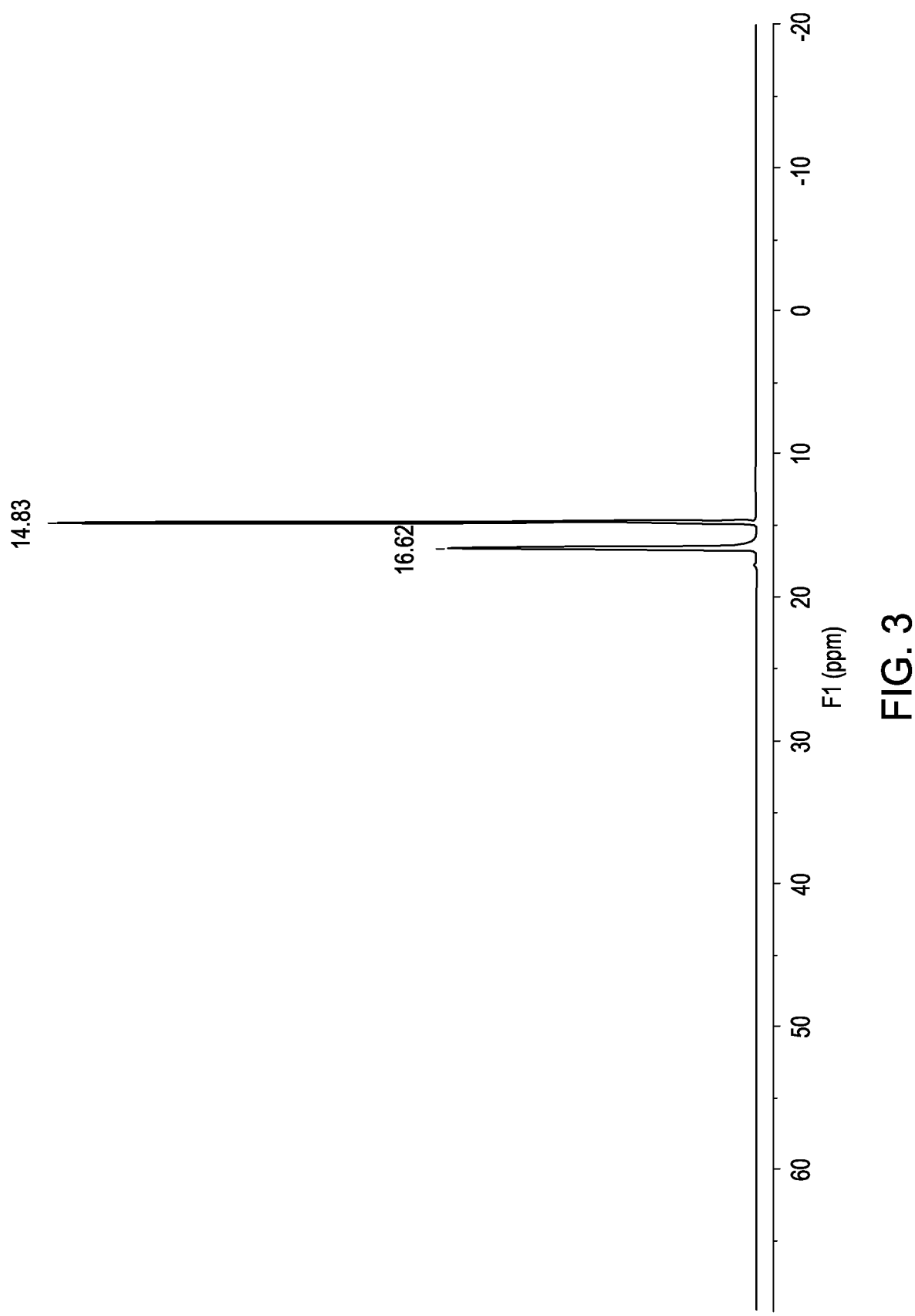
FIG. 3 shows an illustrative $^{11}$B NMR spectrum of a treatment fluid comprising the corrosion inhibitor composition of the present disclosure at a pH value of 6.6 including a fluoride source.

Upon addition of 0.363 moles of ammonium bifluoride (ABF), as shown in Table 1, to form the expected reaction fluid without any other source of acid, the signals completely shift up-field, as provided in Table 2 and FIG. 3. Such signal shift indicates that the N—B complexes convert to B—F species, namely boron tetrafluoride ($BF_4^-$). Boron-11 (B11) is a quadrupolar nuclei having a spin quantum number (I) of 3/2; this leads to a splitting pattern given by 2I+1 when coupled to another magnetically active spin, such as fluorine (I=1/2). The boron-fluorine coupling constant (J) corresponds to $BF_4^-$. The possibility of forming other fluoroborate species is a function of different variables, such as boron and fluoride total concentration, pH, and any other competing equilibria (e.g., the presence of silicon or aluminum, zirconium, titanium ions or calcium, magnesium, or strontium ions can shift the speciation and equilibrium away from the boron system). Species that can form in the B—F—$H^+$ system are established, such as $BF_2(OH)_2^-$, $BF(OH)_3^-$, $BF_{3(OH)}^-$, $B(OH)_3$, and $BF_4^-$. In the case of the TEA-B (OR)$_3$ mixture tested, the concentration of the B is very high, hence the speciation is dominated by initial and final equilibrium and there is no opportunity for speciation. The major species detected is the $BF_4^-$ at 14.83 ppm (singlet), and a very small amount of $BF_3(OH)^-$ anion at 16.62 ppm (quartet, B—F coupling). The signal broadening in the pH 6.6 (pH≥6) solution, fluoride-free, is due to the quadrupolar relaxation of the B11 nuclei.

TABLE 2

| $^{11}$B Signals Before and After 0.363 moles of ABF | |
|---|---|
| $^{11}$B Signals before ABF (ppm) | $^{11}$B Signals after ABF (ppm) |
| 3 broad singlets: 33.11, 30.14, 26.46 pH ≥ 8 (FIG. 2) | 1 signal: 16.62 (BF$_3$(OH)$^-$) 1 signal: 14.83 (BF$_4^-$ major) pH = 6.6 pH = 6.6 (FIG. 3) |

Figure 4:
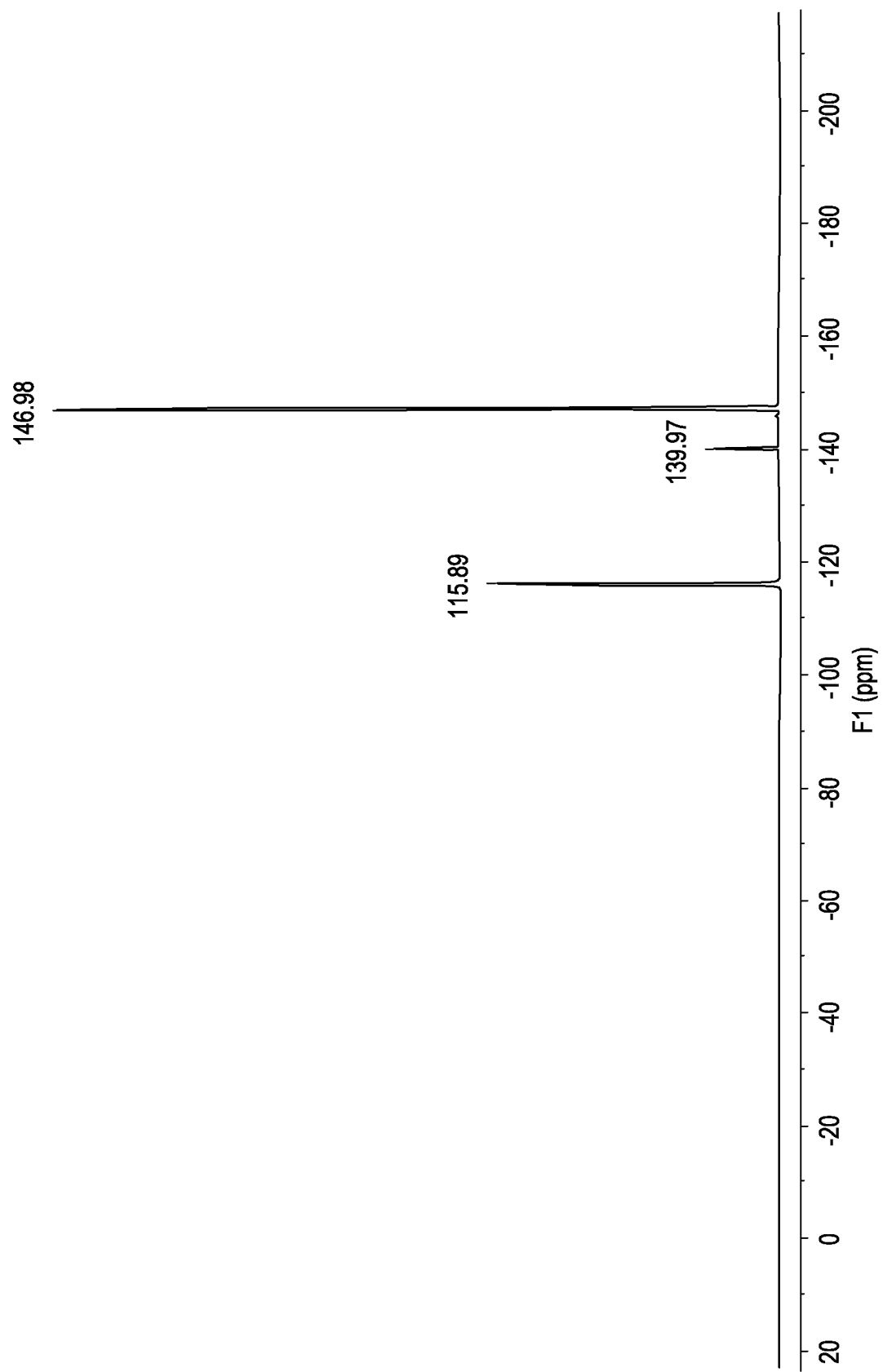
FIG. 4 shows an illustrative $^{19}$F NMR spectrum of a treatment fluid comprising the corrosion inhibitor composition of the present disclosure at a pH value of 6.6 including a fluoride source.

The NMR $^{19}$F (I=1/2) spectroscopic analysis of the treatment fluids having 0.363 moles of ABF of Table 1. As shown in FIG. 4, the $^{19}$F NMR spectrum of 30% TEA-B in fresh water at pH=6.6 in the presence of fluoride concentration of ABF (F/B=8) displays a singlet signal at −115.89 ppm, which is indicative of free fluoride ions (F$^-$). Additionally, two signals are seen at −139.97 ppm, which is indicative of BF$_3$(OH)—, and −146.98, which corresponds to tetrafluoroborate, BF$_4^-$. The signal readings are provided in Table 3.

TABLE 3

| $^{19}$F Signals After 0.363 moles of ABF (ppm) |
|---|
| 4 signals: −115.89 (F$^-$), −139.97 BF$_3$(OH)$^-$), −146.98 (BF$_4$)$^-$ pH = 6.6 (FIG. 4) |

Figure 5:
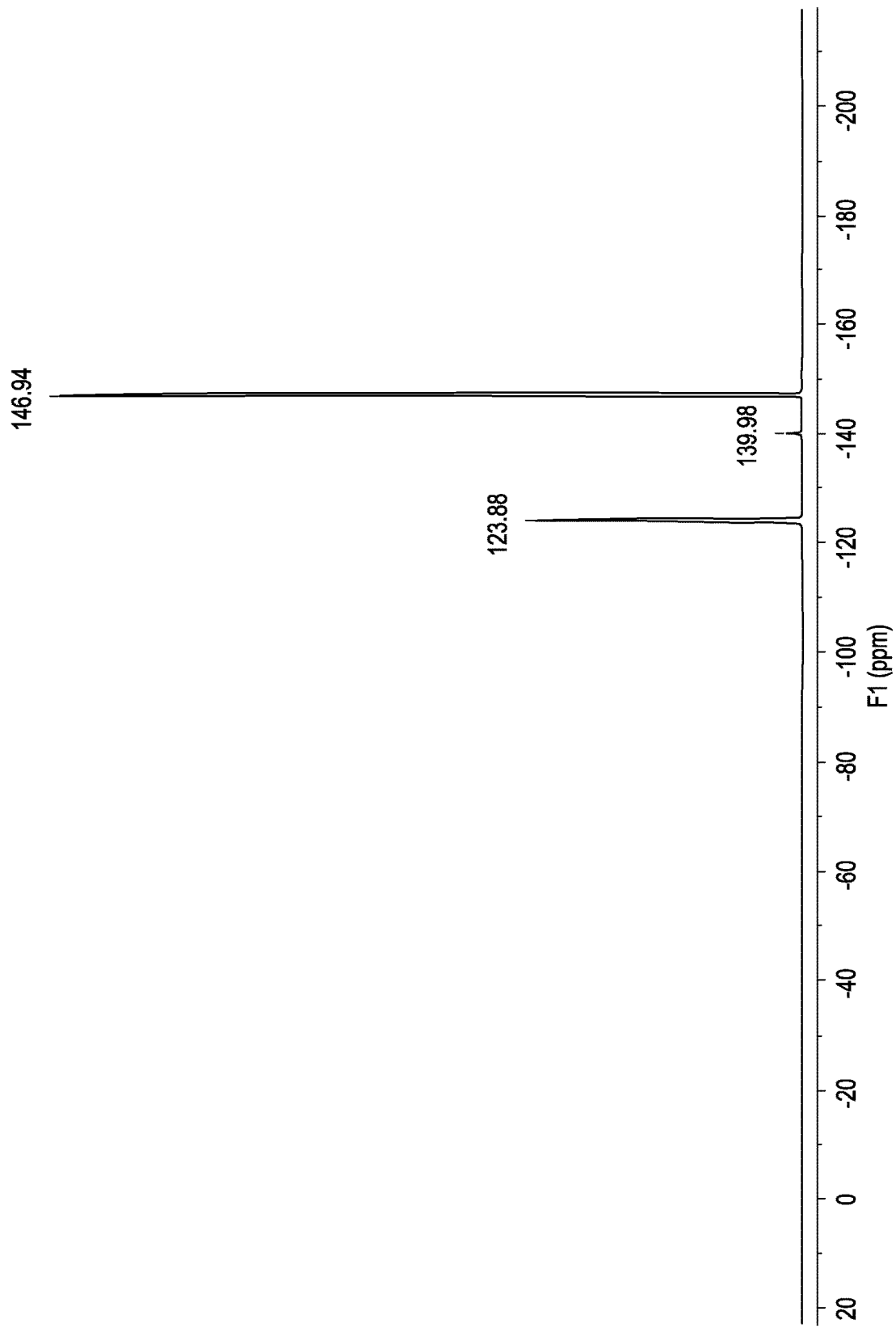
FIG. 5 shows an illustrative $^{19}$F NMR spectrum of a treatment fluid comprising the corrosion inhibitor composition of the present disclosure at a pH value of 5.9 including a fluoride source.

FIG. 5 represents the $^{19}$F spectrum for the treatment fluid of Table 1 with the addition of 0.477 moles of ABF at pH 5.9. Three signals were observed. One signal at −139.98 ppm, which corresponds to (HO)BF$_3^-$ and one signal at −146.94 ppm correspond to BF$_4^-$. The signal at −123.88 ppm may correspond to another fluoroborate species, such as (BF(OH)$_3^-$ or BF$_2$(OH)$_2^-$. The signal readings are provided in Table 4.

TABLE 4

| $^{19}$F Signals After 0.477 moles of ABF (ppm) |
|---|
| 3 signals: −123.88 (BF(OH)$_3^-$, or BF$_2$(OH)$_2^-$), −139.98 ((HO)BF$_3^-$), −146.94 (BF$_4^-$) pH = 5.9 (FIG. 5) |

Figure 6:
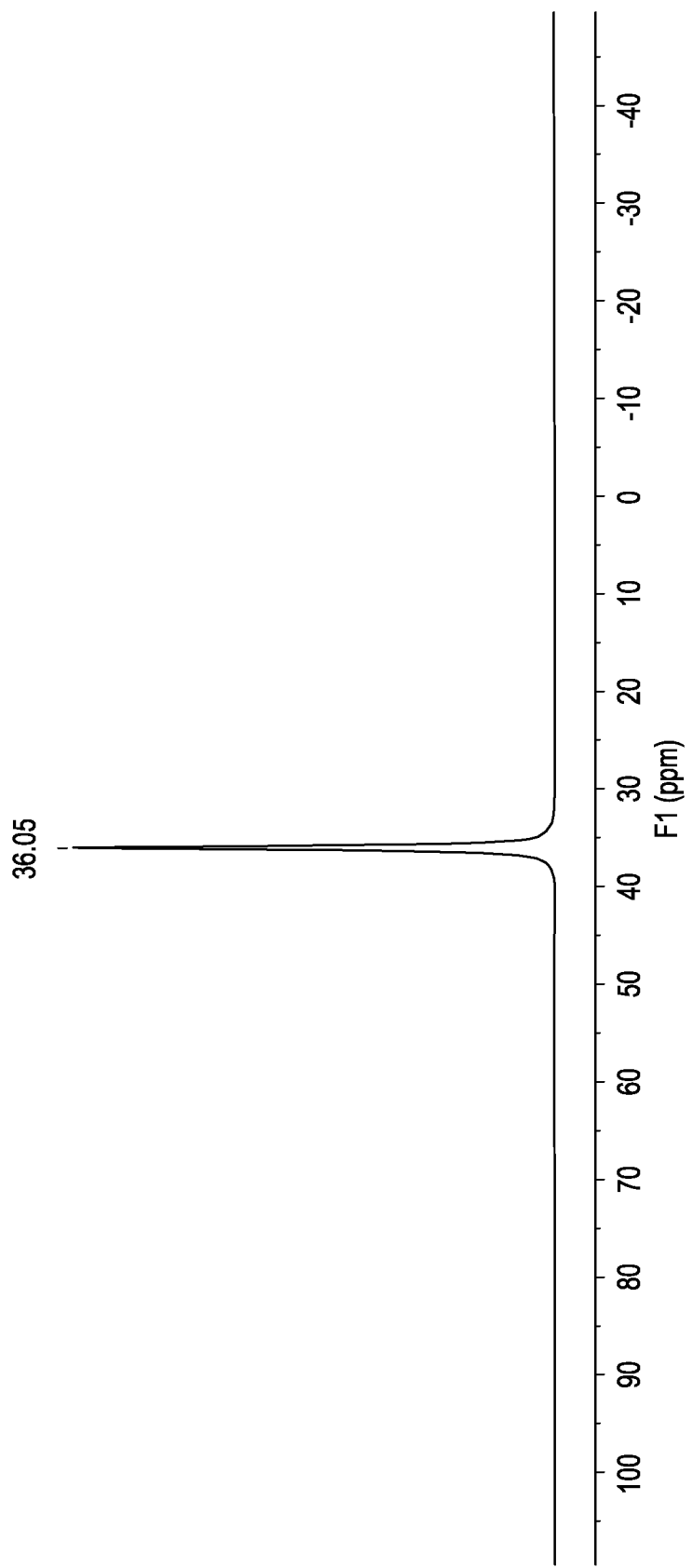
FIG. 6 shows an illustrative $^{11}$B NMR spectrum of a treatment fluid comprising the corrosion inhibitor composition of the present disclosure at a pH value of 4 absent a fluoride source.

Example 2: The $^{11}$B control treatment fluid comprising only 0.095 moles of TEA-B and no ABF were evaluated at a pH≤5. After addition of the ABF, as shown in Table 1, the complex formation and equilibria of the treatment fluid of Table 1 was evaluated by $^{11}$B NMR at pH=5.8 or pH=3. As shown in FIG. 6, the $^{11}$B NMR spectrum of a control treatment fluid having 15% w/vol TEA-B in fresh water at pH=4 in the absence of ABF displayed a single signal at 36.05 ppm, corresponding to B(OH)$_3$/BO$_4^-$ species. At such low pH values, the TEA-B can come out of solution, and thus a reduced concentration of TEA-B was used for control testing. Accordingly, as compared to a pH of ≥6, the drop in pH to ≤5 caused the three signals shown in FIG. 2 to collapse to a single signal, representing B(OH)$_3$/BO$_4^-$, as shown in FIG. 6 at a pH of 4 in the absence of ABF.

Figure 7:
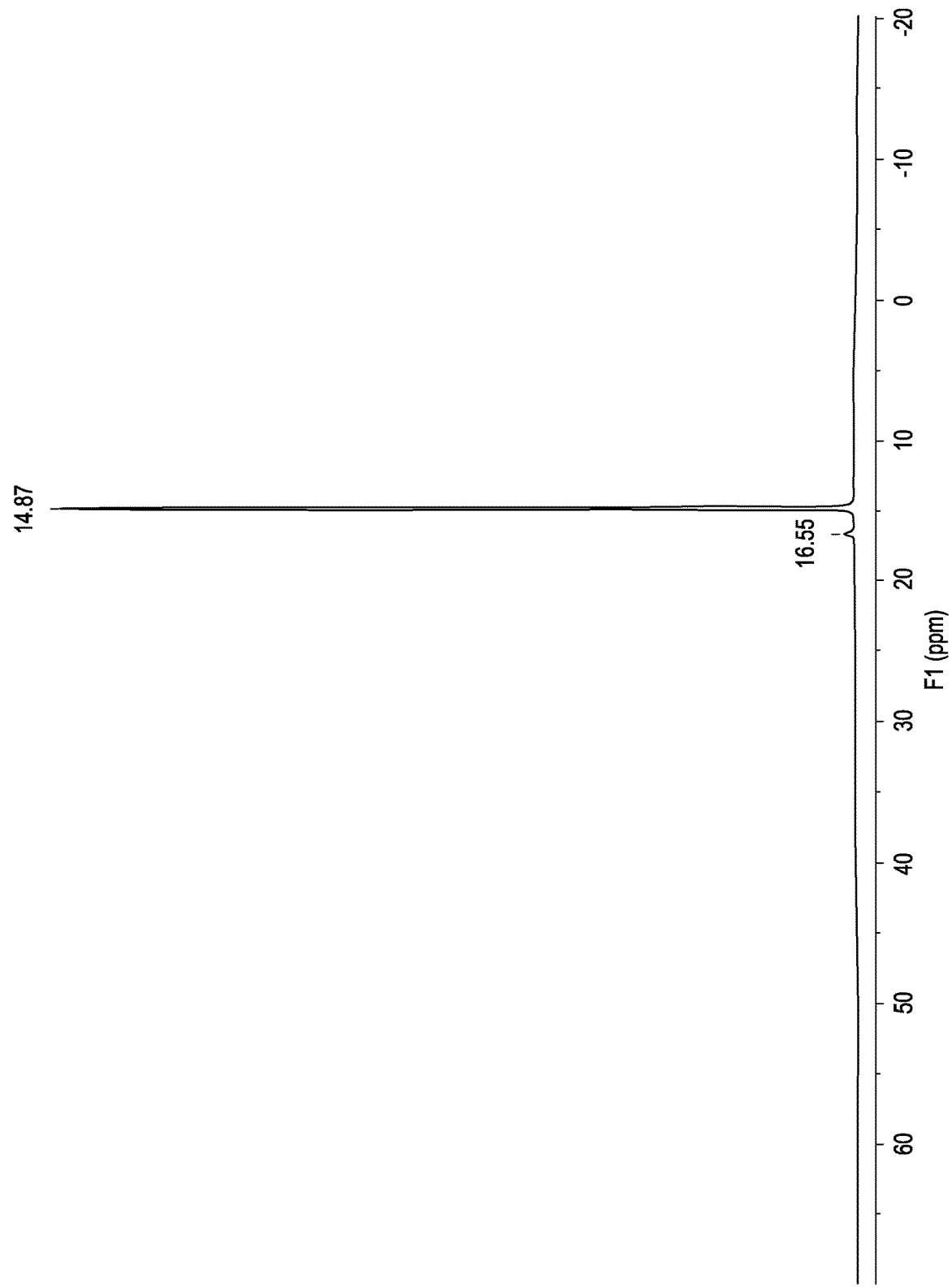
FIG. 7 shows an illustrative $^{11}$B NMR spectrum of a treatment fluid comprising the corrosion inhibitor composition of the present disclosure at a pH value of 5.8 including a fluoride source.

Upon addition of 0.535 moles of ammonium bifluoride to form the treatment fluid of Table 1, the fluoridated species resonates at 14.87 ppm (BF$_4^-$) and a minor quartet signal at 16.55 ppm corresponding to BF$_3$(OH)$^-$ is seen, suggesting cleavage of the complex B(OR)$_3$:NEt$_3$ with F$^-$, as shown in FIG. 7. The signal readings are provided in Table 5. The predominant species after addition of the fluoride source is BF$_4^-$ at pH 5.8.

TABLE 5

| $^{11}$B Signals Before and After 0.535 moles of ABF (ppm) at pH = 5.8 | |
|---|---|
| $^{11}$B Signals before ABF (ppm) | $^{11}$B Signals after ABF (ppm) |
| 1 signal: 36.06 (single peak) (BO$_4^-$)/B(OH)$_3$) pH = 4 (FIG. 6) | 1 quartet: 16.55 (BF$_3$(OH)$^-$) 1 signal: 14.87 (BF$_4^-$) pH = 5.8 (FIG. 7) |

Figure 8:
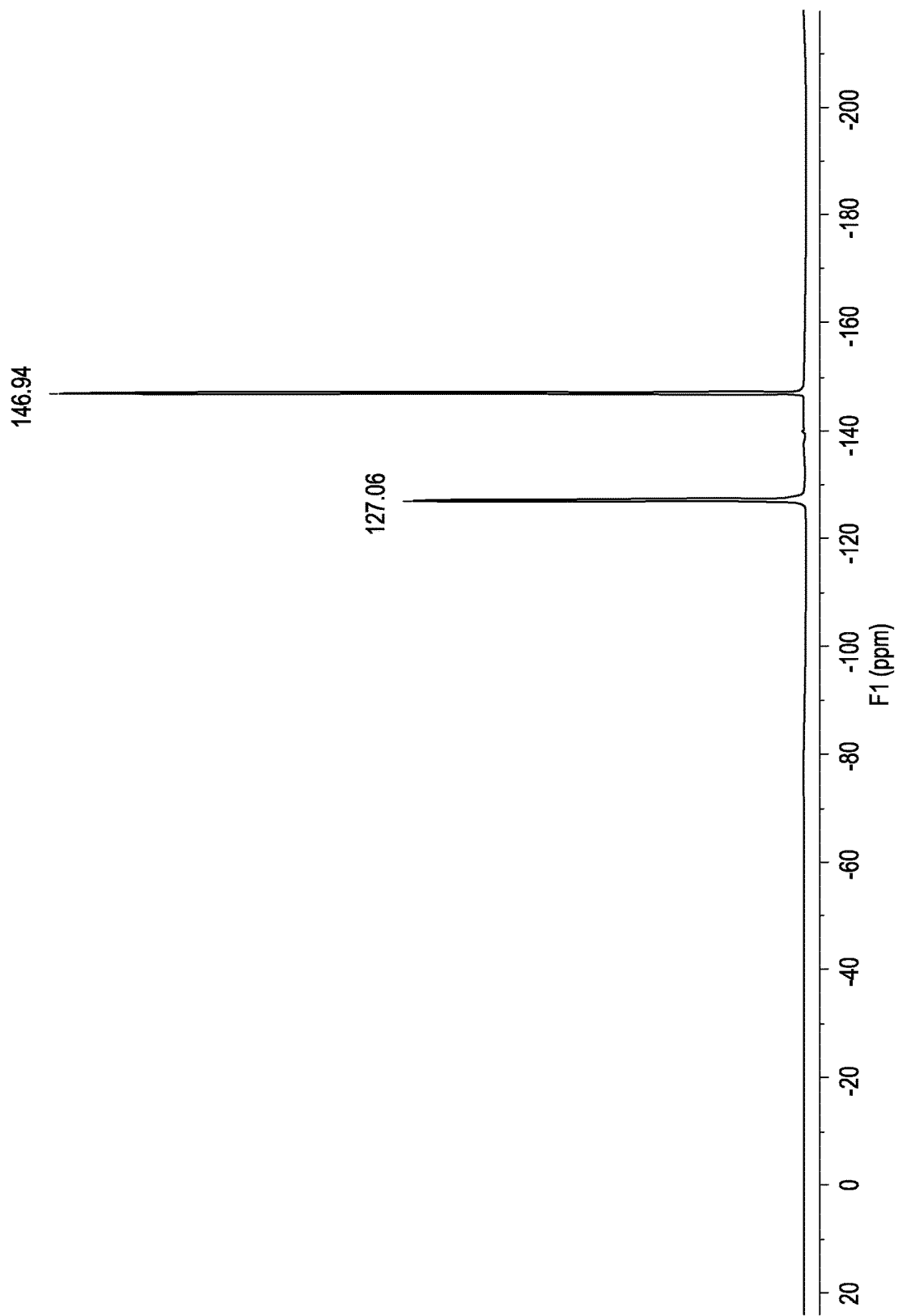
FIG. 8 shows an illustrative $^{19}$F NMR spectrum of a treatment fluid comprising the corrosion inhibitor composition of the present disclosure at a pH value of 5.8 including a fluoride source.

The $^{19}$F spectra of the treatment fluid of Table 1 having 0.535 moles of ABF added was evaluated at a pH of =5.8 and pH=3 with a nuclear spin of ½. As shown in FIG. 8, the $^{19}$F NMR spectrum of 30% TEA-B in fresh water at pH=5.8 in the presence of ABF displays two signals at −127.06 ppm and −146.94 ppm, which could correspond to various fluorinated species, such as: the −127.06 ppm signal may be ascribed to either BF$_2$(OH)$_2^-$ or BF(OH)$_3^-$ and −146.94 ppm signal may be indicative of BF$_4^-$. The signal readings are provided in Table 6.

TABLE 6

| $^{19}$F Signals Before and After 0.535 moles of ABF (ppm) at pH = 5.8 |
|---|
| $^{19}$F Signals after ABF (ppm) |
| Two signals: −127.06 ((BF$_2$(OH)$_2^-$ or BF(OH)$_3^-$,), −146.94 (BF$_4^-$) pH = 5.8 (FIG. 8) Addition of 15% HCl acid: −125.78 (BF$_2$(OH)$_2^-$ or BF(OH)$_3^-$, −146.90 (BF$_4^-$), −155.25 (HF) pH = 3 (FIG. 9) |

The $^{19}$F spectra of the treatment fluid of Table 1 having 0.535 moles of ABF added was evaluated at a pH of =3. Addition of 32 mL of a 15% hydrochloric acid (HCl) to the solution to the treatment fluid achieved the lower pH=3, and, as shown in FIG. 9, the $^{19}$F spectrum revealed a new signal at −155.25 ppm, which is indicative of free hydrofluoric acid. Noticeably, there is no free fluoride in the spectrum at pH=3. The signal readings are provided in Table 7.

TABLE 7

| $^{19}$F Signals Before and After 0.535 moles of ABF (ppm) at pH = 3 |
|---|
| $^{19}$F Signals after ABF (ppm) |
| Three signals: −125.78 (BF$_2$(OH)$_2^-$ or BF(OH)$_3^-$, −146.90 (BF$_4^-$), −155.25 (HF) pH = 3 (FIG. 9) |

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the specification and attached claims are approximations that may vary depending upon the desired properties sought to be obtained by the embodiments of the present disclosure. At the very least, and not as an attempt to limit the application of the doctrine of equivalents to the scope of the claim, each numerical parameter should at least be construed in light of the number of reported significant digits and by applying ordinary rounding techniques.

Therefore, the present disclosure is well adapted to attain the ends and advantages mentioned as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present disclosure. The disclosure illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces.

What is claimed is:

1. A method comprising:
    providing a treatment fluid comprising:
        a fluoride source and a corrosion inhibitor composition comprising an aqueous-based fluid, a boron-hydroxyalkyl(amine) compound, and a methan hydrate inhibitor;
        introducing the treatment fluid into a downhole location including a metal surface comprising titanium or a titanium alloy, wherein the downhole location is selected from the group consisting of a location in a wellbore penetrating a subterranean formation, a location in fluid communication with the wellbore, and any combination thereof; and
        suppressing corrosion of the metal surface by the fluoride source with the corrosion inhibitor composition.

2. The method of claim 1, wherein the fluoride source is selected from the group consisting of a fluoride ion, hydrofluoric acid, a hydrofluoric acid-generating compound, and any combination thereof.

3. The method of claim 1, wherein the boron-hydroxyalkyl(amine) compound has a boron-nitrogen molar equivalency of about 1:1.

4. The method of claim 1, wherein the boron-hydroxyalkyl(amine) compound is selected from the group consisting of triethanolamine borate, a derivative of triethanolamine borate, and any combination thereof, or wherein the boron-hydroxyalkyl(amine) compound is a mixture of a boron source and tri(alkyl alcohol)amine and the alkyl is an ethyl, a propyl, a butyl, a pentyl, or any isomer thereof.

5. The method of claim 1, wherein the metal surface is located in a subsea drilling and production system.

6. The method of claim 1, wherein the metal surface is located in a subsea drilling and production system and is selected from the group consisting of a drilling riser, a top stress joint, a bottom stress joint, a downhole casing, and any combination thereof.

7. The method of claim 1, wherein the metal surface is downhole casing in a geothermal well.

8. A method comprising:
    introducing a treatment fluid into a downhole location through an umbilical, the treatment fluid comprising:
        a fluoride source; and
        a corrosion inhibitor composition comprising an aqueous-based fluid, a boron-hydroxyalkyl(amine) compound, and a methane hydrate inhibitor,
    wherein the into a downhole location is a subsea drilling and production system which includes a metal surface comprising titanium or a titanium alloy; and
    suppressing corrosion of the metal surface by the fluoride source with the corrosion inhibitor composition.

9. The method of claim 8, wherein the fluoride source is selected from the group consisting of a fluoride ion, hydrofluoric acid, a hydrofluoric acid-generating compound, and any combination thereof.

10. The method of claim 8, further comprising preparing the corrosion inhibitor by mixing a boron source and a hydroxyalkyl(amine) prior to the step of introducing a treatment fluid into a downhole location through an umbilical.

11. The method of claim 10, wherein the hydroxyalkyl(amine) is tri(alkyl alcohol)amine wherein the alkyl is an ethyl, a propyl, a butyl, a pentyl, or any isomer thereof.

12. The method of claim 8, wherein the corrosion inhibitor is prepared on-the-fly.

13. The method of claim 8, wherein the boron-hydroxyalkyl(amine) compound is selected from the group consisting of triethanolamine borate, a derivative of triethanolamine borate, and any combination thereof, or wherein the boron-hydroxyalkyl(amine) compound is a mixture of a boron source and tri(alkyl alcohol)amine and the alkyl is an ethyl, a propyl, a butyl, a pentyl, or any isomer thereof.

14. The method of claim 8 wherein the titanium or titanium alloy comprises at least of one Ti Grade 29 alloy, Ti Grade 7 alloy, or CP-Ti.

15. The method of claim 8, wherein the metal surface is located in a subsea drilling and production system and is selected from the group consisting of a drilling riser, a top stress joint, a bottom stress joint, a downhole casing, and any combination thereof.

16. The method of claim 8, wherein the metal surface is downhole casing in a geothermal well having a bottomhole temperature greater than about 176° C.

17. A method comprising:
    providing a treatment fluid comprising:
        a fluoride source and a corrosion inhibitor composition comprising an aqueous-based fluid and a boron-hydroxyalkyl(amine) compound, wherein the boron-hydroxyalkyl(amine) compound is a reaction product of an amine and a boric acid triester, the boric acid triester selected from the group consisting of 2-ethoxy-4,4,5,5-tetramethyl-1,3,2-dioxaborolane, 2-isopropoxy-4,4,5,5-tetramethyl-1,3,2-dioxaborolane, 2-isopropoxy-4,4,6-trimethyl-1,3,2-dioxaborinane, 2-methoxy-4,4,5,5-tetramethyl-1,3,2-dioxaborolane, tributyl borate, tridecyl borate, triethyl borate, trihexyl borate, triisopropyl borate, 2,4,6-trimethoxyboroxin, trimethyl borate, trioctadecyl borate, tri-n-octyl borate, triphenyl borate, tripropyl borate, tris(4-chlorophenyl) borate, tris(2-cyanoethyl) borate, tris(hexafluoroisopropyl) borate, tris(2, 2,2-trifluoroethyl) borate, tris(trimethylsilyl) borate, tritetradecyl borate, tri-o-tolyl borate, and any combination thereof;

introducing the treatment fluid into a downhole location including a metal surface comprising titanium or a titanium alloy, wherein the downhole location is selected from the group consisting of a location in a wellbore penetrating a subterranean formation, a location in fluid communication with the wellbore, and any combination thereof; and suppressing corrosion of the metal surface by the fluoride source with the corrosion inhibitor composition.

18. A method comprising:

introducing a treatment fluid into a downhole location through an umbilical, the treatment fluid comprising:
a fluoride source; and
a corrosion inhibitor composition comprising an aqueous-based fluid and a boron-hydroxyalkyl(amine) compound wherein the boron-hydroxyalkyl(amine) compound is a reaction product of an amine and a boric acid triester, the boric acid triester selected from the group consisting of 2-ethoxy-4,4,5,5-tetramethyl-1,3,2-dioxaborolane, 2-isopropoxy-4,4,5,5-tetramethyl-1,3,2-dioxaborolane, 2-isopropoxy-4,4,6-trimethyl-1,3,2-dioxaborinane, 2-methoxy-4,4,5,5-tetramethyl-1,3,2-dioxaborolane, tributyl borate, tridecyl borate, triethyl borate, trihexyl borate, triisopropyl borate, 2,4,6-trimethoxyboroxin, trimethyl borate, trioctadecyl borate, tri-n-octyl borate, triphenyl borate, tripropyl borate, tris(4-chlorophenyl) borate, tris(2-cyanoethyl) borate, tris(hexafluoroisopropyl) borate, tris(2,2,2-trifluoroethyl) borate, tris(trimethylsilyl) borate, tritetradecyl borate, tri-o-tolyl borate, and any combination thereof, wherein the into a downhole location is a subsea drilling and production system which includes a metal surface comprising titanium or a titanium alloy; and suppressing corrosion of the metal surface by the fluoride source with the corrosion inhibitor composition.

* * * * *